United States Patent
Lee et al.

(10) Patent No.: US 12,223,127 B2
(45) Date of Patent: Feb. 11, 2025

(54) ACTIVE STYLUS HAVING PHYSICAL WRITING FUNCTION

(71) Applicants: RENAISSER TECHNOLOGY CO., LTD., Zhubei (TW); DEXIN CORP., New Taipei (TW)

(72) Inventors: Shih-Yen Lee, Zhubei (TW); Tzu-Yu Ting, Zhubei (TW); Yeh Sen-Fan Chueh, Zhubei (TW); Min-Hung Lin, New Taipei (TW); Shih-Hsiung Hsiao, New Taipei (TW)

(73) Assignees: Renaisser Technology Co., Ltd. Corp., Zhubei (CN); Dexin Corp., New Taipei (CN)

( * ) Notice: Subject to any disclaimer, the term of this patent is extended or adjusted under 35 U.S.C. 154(b) by 0 days.

(21) Appl. No.: 18/226,830

(22) Filed: Jul. 27, 2023

(65) Prior Publication Data
US 2024/0094834 A1    Mar. 21, 2024

(30) Foreign Application Priority Data
Sep. 15, 2022    (CN) .......................... 202222446601.8

(51) Int. Cl.
*G06F 3/0354*    (2013.01)
*G06F 3/044*    (2006.01)

(52) U.S. Cl.
CPC ........ *G06F 3/03545* (2013.01); *G06F 3/0442* (2019.05)

(58) Field of Classification Search
CPC .. G06F 3/0442; G06F 3/0441; G06F 3/03545; G06F 3/0383; G06F 2203/0384; B43K 19/08; B43K 29/08; B43K 19/04; B43K 19/02; C09D 13/00
See application file for complete search history.

(56) References Cited

U.S. PATENT DOCUMENTS

| | | | |
|---|---|---|---|
| 2016/0040269 A1* | 2/2016 | Huettner | C22C 9/04 401/215 |
| 2018/0164908 A1* | 6/2018 | Tanaka | G06F 3/0383 |
| 2019/0384996 A1* | 12/2019 | Park | G06F 3/0393 |
| 2021/0318766 A1* | 10/2021 | Ninomiya | G06F 3/0442 |
| 2021/0406514 A1* | 12/2021 | Nunally | G06V 40/382 |

* cited by examiner

Primary Examiner — Robin J Mishler
Assistant Examiner — Amen W Bogale
(74) Attorney, Agent, or Firm — Juan Carlos A. Marquez; Marquez IP Law Office, PLLC (57) ABSTRACT

An active stylus having physical writing function includes a tip shell including a first opening and a second opening, a first electrode including a first end protruded through the first opening of the tip shell and including a second end protruded through the second opening of the tip shell and entered a main body housing of the active stylus, wherein the first electrode includes conductive material. The tip shell includes non-conductive material. The first end of the first electrode is configured to leave colored traces on an object by physical friction caused between the first end of the first electrode and the object.

14 Claims, 11 Drawing Sheets

ACTIVE STYLUS HAVING PHYSICAL WRITING FUNCTION

TECHNICAL FIELD

The subject matter herein generally relates to an active stylus, and more particularly relates to an active stylus having physical writing function.

BACKGROUND

With the development of various electronic devices, many electronic devices, such as smart phones and tablets, use touch panels as operation interfaces. In order to achieve control of these electronic devices, a stylus has emerged as required. The stylus is a pen-shaped tool, and the user can operate the stylus on the touch panel to perform command input to the electronic device. The current stylus only has the electronic trace writing ability based on signal interactions, and has no physical writing ability.

SUMMARY

The purpose of the present disclosure is to provide an active stylus having physical writing function.

To achieve the above purpose, the application provides an active stylus. The active stylus includes a tip shell and a first electrode. The tip shell includes a first opening and a second opening. The tip shell includes non-conductive material. The first electrode includes a first end protruded through the first opening of the tip shell and a second end protruded through the second opening of the tip shell to enter a main body housing of the active stylus. The first electrode includes conductive material. Moreover, the first end of the first electrode is configured to leave colored traces on an object by physical friction caused between the first end of the first electrode and the object.

It should be understood that the description in the section is not intended to identify key or important features of embodiments of the present disclosure, nor is it intended to limit the scope of the present disclosure. Other features of the present disclosure will be readily understood from the following specification.

BRIEF DESCRIPTION OF THE DRAWINGS

In the accompanying drawings, unless otherwise specified, the same reference numerals throughout multiple accompanying drawings indicate the same or similar parts or elements. These accompanying drawings are not necessarily drawn to scale. It should be understood that these accompanying drawings depict only some embodiments disclosed in accordance with the present disclosure and should not be considered as limiting the scope of the present disclosure.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasable connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other words that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

As shown in FIGS. 1 to 9, the present disclosure provides an active stylus having a physical writing function. The active stylus includes a main body housing D, a tip shell 6, a first electrode 1. In some embodiments, the tip shell 6 includes non-conductive material. The tip shell 6 includes a first opening 62 and a second opening 61. The first electrode 1 includes conductive material and is mounted in the tip shell 6. A first end 12 of the first electrode 1 is protruded through the first opening 62 and a second end 11 is protruded through the second opening 61 of the tip shell 6 and entered a main body housing of the active stylus.

In this embodiment, the first end 12 of the first electrode 1 is includes a writable conductive material. In some embodiments, the writable conductive material includes Graphite alloy. In some embodiments, the writable conductive material includes Zinc alloy. In some other embodiments, the writable conductive material includes Lead alloy.

Therefore, the first end 12 of the first electrode 1, in some embodiments, is able to leave colored traces on an object by physical friction caused between the first end 12 of the first electrode 1 and the object. In some embodiments, the object includes a piece of paper. In some embodiments, the object includes a wall. In some embodiments, the object includes a white board.

Therefore, the first electrode 1 of the active stylus of the present disclosure includes at least two writing functions.

The first electrode 1 of the active stylus of the present disclosure is configured to transmit wireless touch control signals to an electronic apparatus with a touch control panel, e.g. tablets, while the active stylus is applied on the electronic apparatus. The electronic apparatus is then capable of determining the position of the active stylus on the touch control panel, tilt of the active stylus and other information of the active stylus in response to the received wireless touch control signals. Therefore, the traces of the active stylus, caused by the touch control interactions between the active stylus and the touch panel of the electronic apparatus are displayed on the touch control panel.

Moreover, when a user uses the active stylus of the present disclosure to write on an object such as a piece of paper. The writable conductive material of the first end 12 is left on the piece of paper to form colored traces on the piece of paper due to physical frictions caused between the first end 12 and the piece of paper.

Therefore, the active stylus of the present disclosure has signal-based electronic writing and control functions and also performs non-electronic writing on paper, walls, and other writing objects based on physical contact.

In this embodiment, the tip shell 6 includes non-conductive material, e.g., rubber or silicone which will not affect the signal transmission of the first electrode 1.

In some embodiments, the first end 12 of the first electrode 1 includes a writable conductive material which allows the active stylus to have functions of electronic writing and physical writing.

In some embodiments, the first electrode 1 includes a non-writing electrode P1 and a writing electrode P2. A first end of the writing electrode P2 is protruded through the first opening 62 and is used to perform functions of electronic writing and physical writing. The non-writing electrode P1 includes an end away from an end of the writing electrode P2 is the second end 11 of the first electrode 1. An end of the non-writing electrode P1 includes a receiving cavity 13 for receiving the second end of the writing electrode P2. In this configuration, the writing electrode P2 is replaceable while the writing electrode P2 is excessively wear.

In some embodiments, the writing electrode P2 includes a writable conductive material and the non-writing electrode P1 includes a conductive material. Therefore, the material of the non-writing electrode P1 is different from the material of the writing electrode P2.

In some embodiments, the material of the writing electrode P2 includes Graphite alloy. The material of the writing electrode P2, in some embodiments, includes Zinc alloy. In some other embodiments, the material of the writing electrode P2 includes Lead alloy. Moreover, in some embodiments, the material of the non-writing electrode P1 includes Aluminum alloy. In some embodiments, the material of the non-writing electrode P1 includes stainless steel. In some other embodiments, the material of the non-writing electrode P1 includes copper. Therefore, the amount of the writable conductive material is then reduced in manufacturing the first electrode 1. Moreover, in some embodiments, the non-writing electrode P1 includes the writable conductive material.

In some embodiments, a first end of the writing electrode P2 includes a frustum 121 and a first end surface of the frustum 121 includes an arc surface 122 and a seamless transition from the arc surface 122 to the frustum 121. In this embodiment, a second end surface of the frustum 121 including a cylinder 14. Moreover, an end of the cylinder 14 away from the frustum 121 is the second end of the writing electrode P2. In this embodiment, the shape of the writing electrode P2 ensures smooth writing and prevents electronic equipment from being scratched. In addition, the seamless transition from the arc surface 122 to the frustum 121 also enhances the signal transmission of the writable electrode P2.

In some embodiments, the tip shell 6 includes a hollow frustum shell and a smooth transition is from an outer peripheral surface of the frustum 121 to an outer peripheral surface of the hollow frustum-shaped housing for providing a tidy appearance of the active stylus.

In some embodiments, the tip shell 6 includes a frustum-shaped housing, a first limit ring 63 and a second limit ring 64. The tip shell 6 further includes a first opening 62 formed at a cross section of the tip shell 6 and a second opening 61 formed at a bottom of the tip shell 6. The first limit ring 63 is formed on an inner side of the tip shell 6 and close to the first opening 62. The second limit ring is formed on the inner side of the tip shell 6 and located between the first opening 62 and the second opening 61. The first limit ring 63 is configured to prevent the writable electrode P2 from detaching. Moreover, the first electrode 1 is then fixed due to the inner structure of the tip shell 6.

Figure 4A:
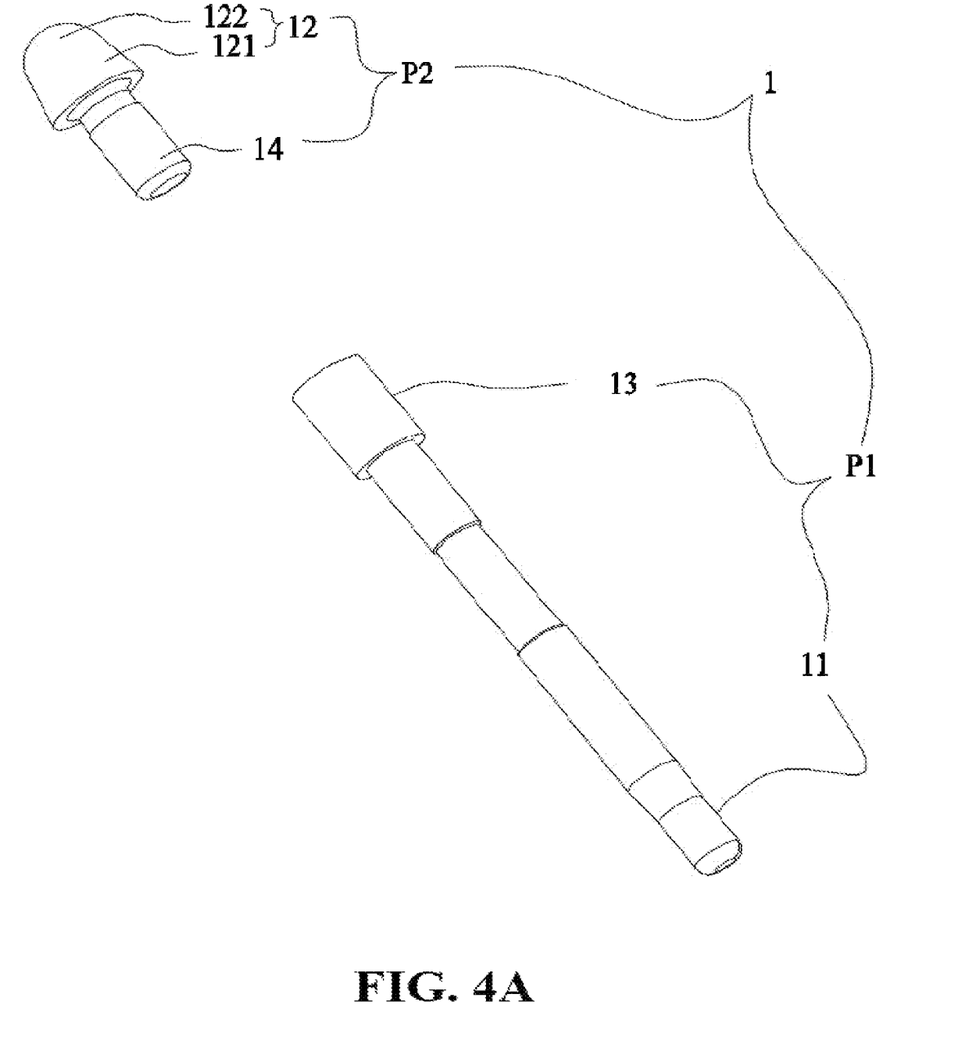
FIG. 4A is a schematic explosion view of a first electrode of one embodiment of the present disclosure.
Figure 4B:
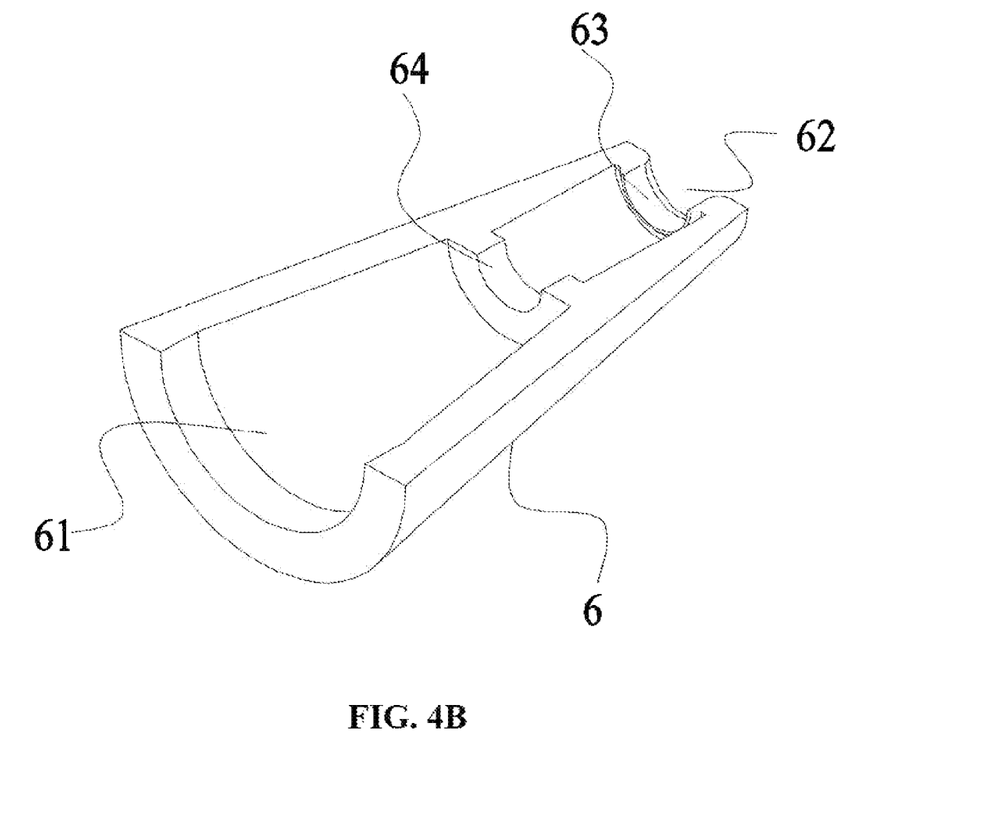
FIG. 4B is a schematic cross-sectional view of a tip shell of one embodiment of the present disclosure.
Figure 5:
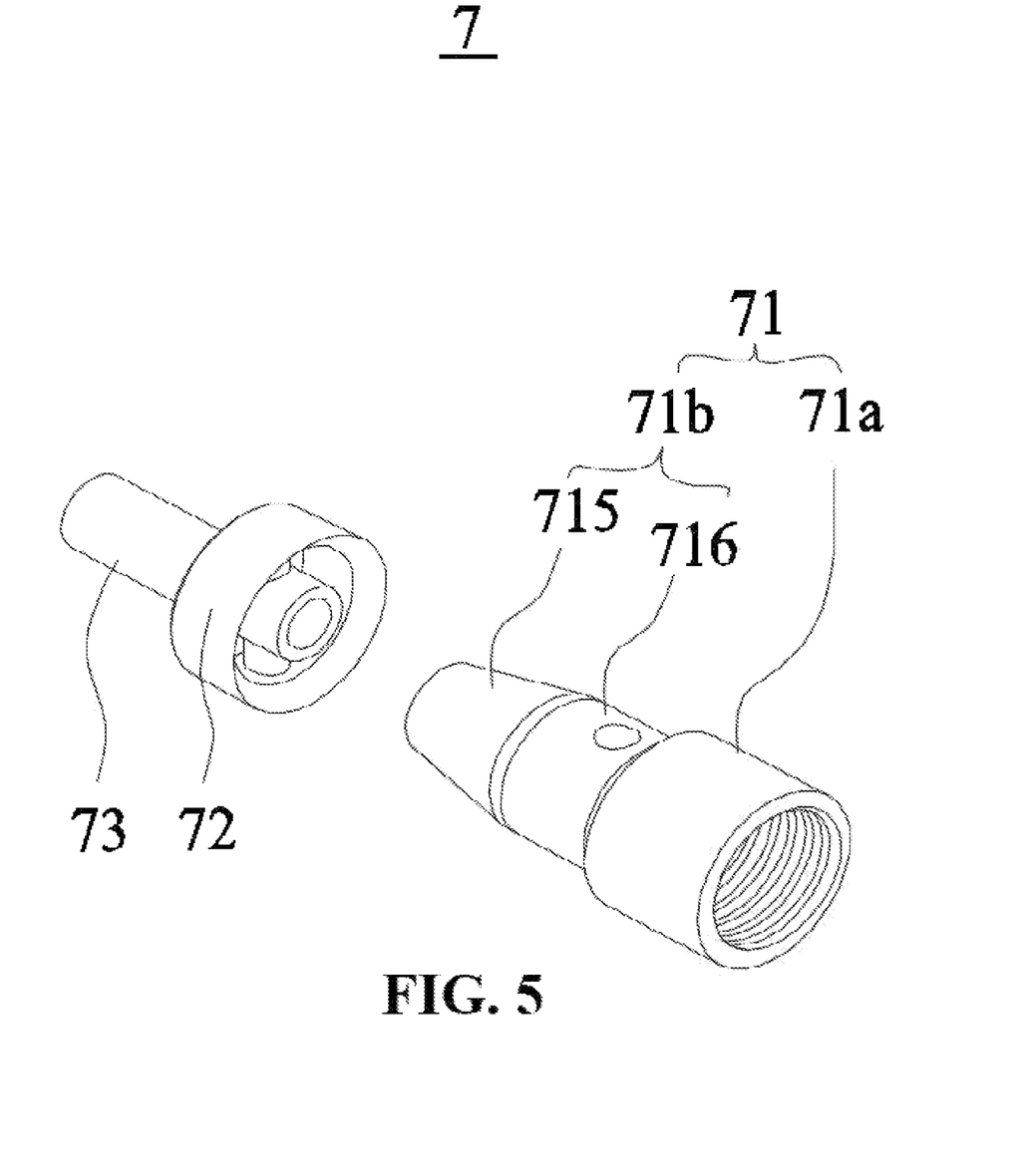
FIG. 5 is a schematic explosion view of a second electrode of one embodiment of the present disclosure.
Figure 6:
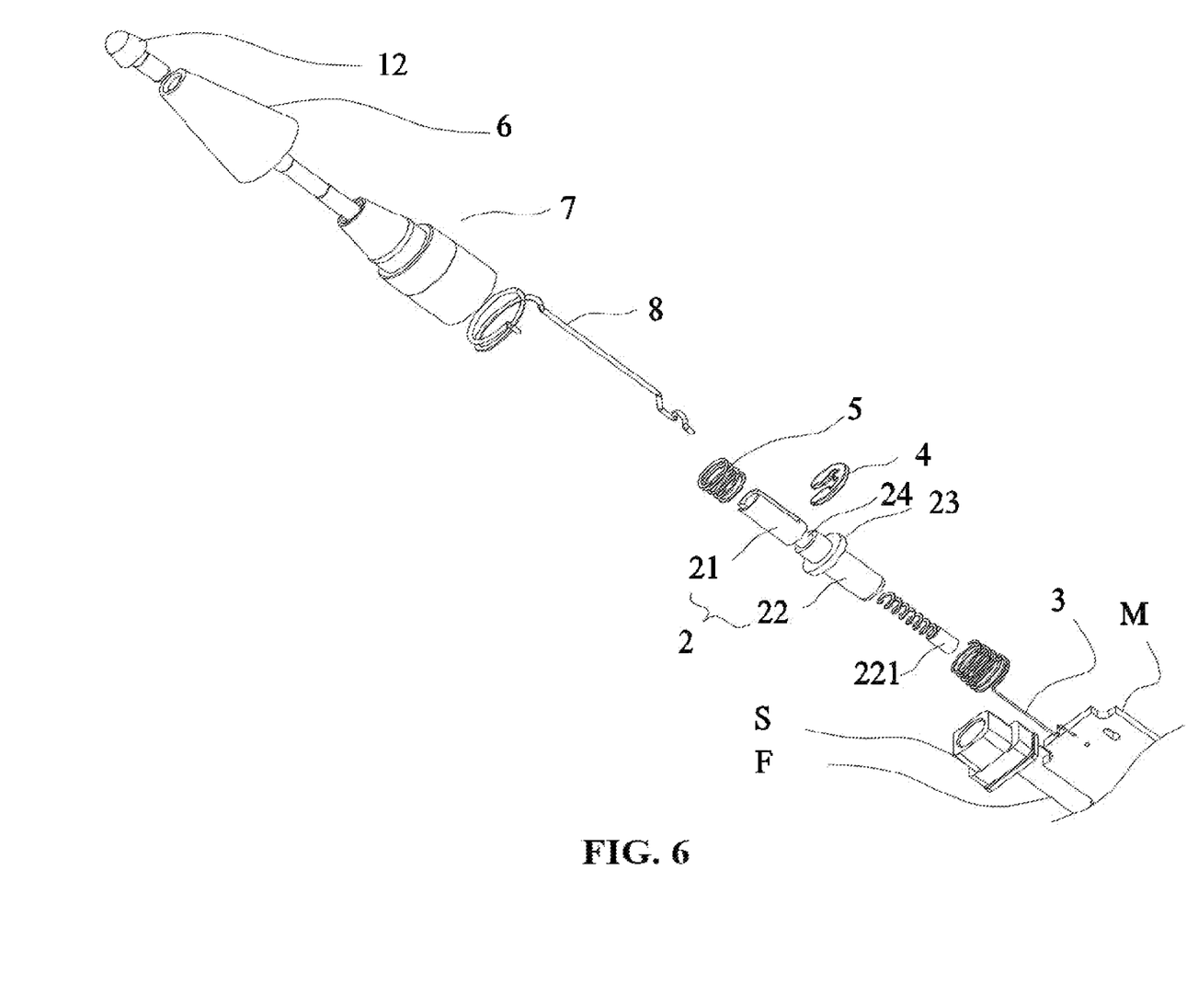
FIG. 6 is a schematic explosion view of a portion of an active stylus of one embodiment of the present disclosure.
Figure 7:
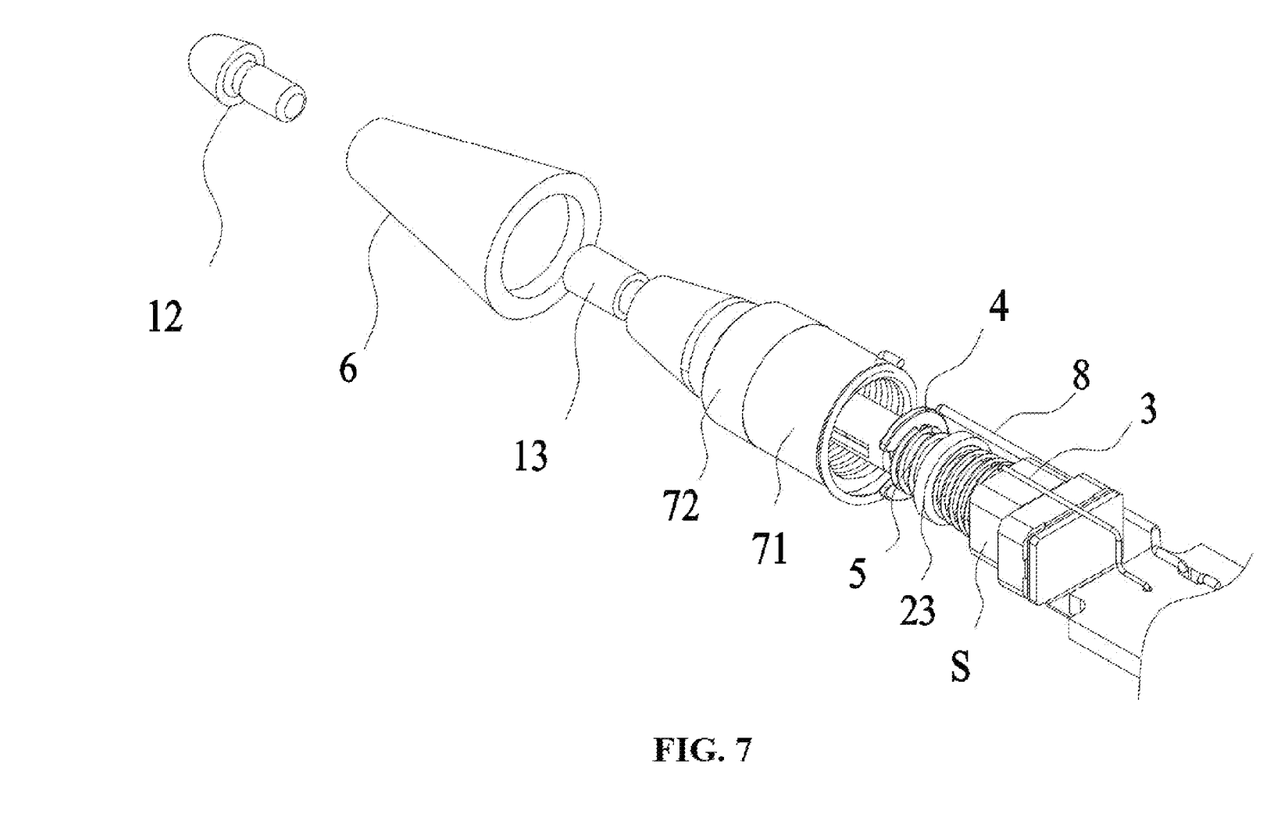
FIG. 7 is a schematic explosion view of a portion of an active stylus of one embodiment of the present disclosure.
Figure 8:
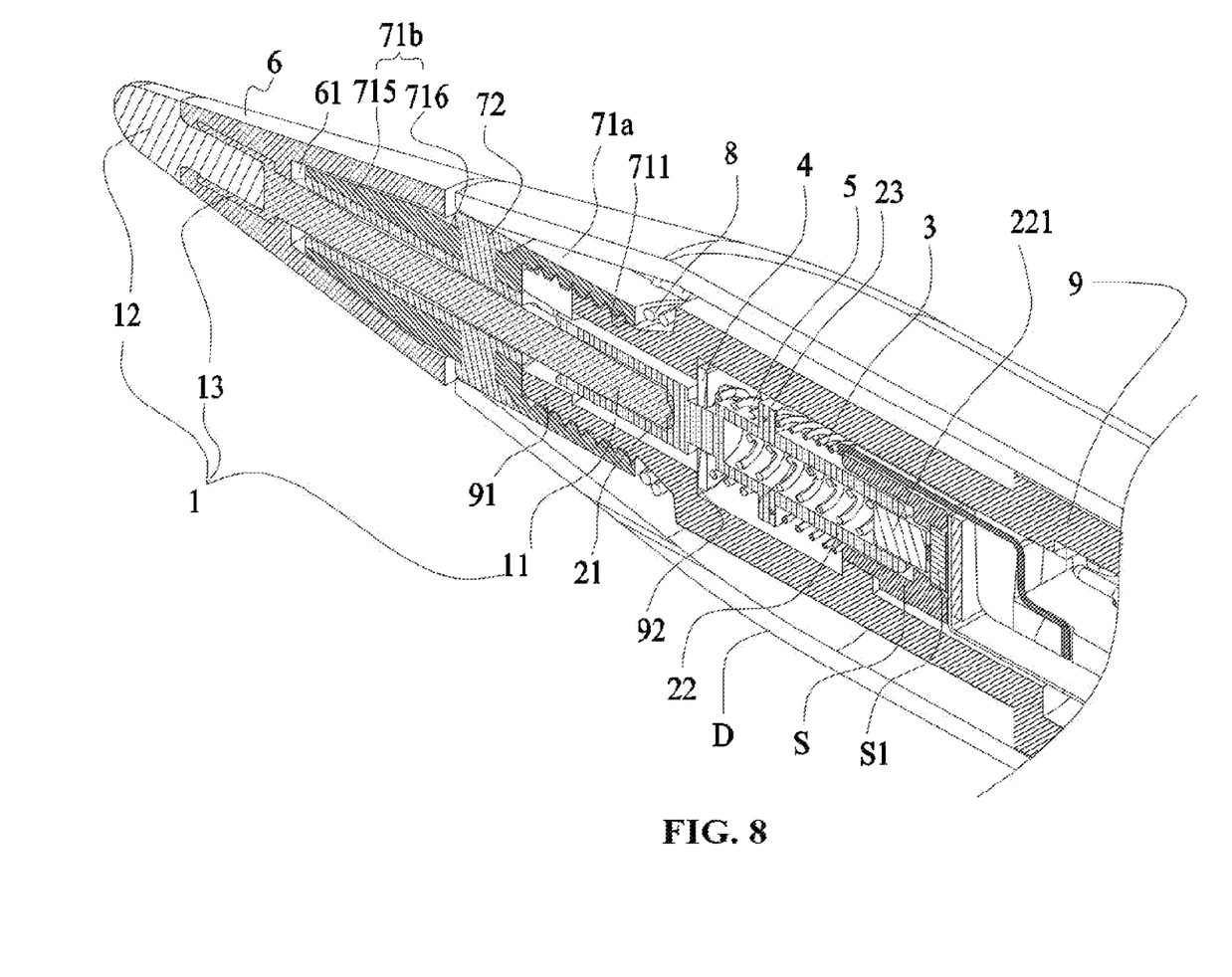
FIG. 8 is a schematic cross-sectional view of a portion of an active stylus of one embodiment of the present disclosure.

As shown in FIGS. 4A and 4B, in this embodiment, the outer diameter of the receiving cavity 13 of the first electrode 1 is greater than the inner diameter of the first limit ring 63. The outer diameter of the receiving cavity 13 of the first electrode 1 is also greater than the inner diameter of the second limit ring 64. Therefore, in this embodiment, the first electrode 1 is then fixed by the first limit ring 63 and the second limit ring 64. An end of the cylinder 14, close to the frustum 121 includes a recess (not shown) which is used for receiving the first limit ring 63 and preventing the writing electrode P2 from detaching.

In some embodiments, the active stylus 100 further includes a main body housing D. The main body housing D includes a pin holder 2 and a second electrode 7. The second electrode 7 includes a first insulating ring 73. The first insulating ring 73 is configured to insulate the first electrode 1. A first end of the second electrode 7 is located in the main body housing D and a second end of the second electrode 7 is protruded through the main body housing 7. In this embodiment, the second electrode 7 includes a cylindrical electrode. Moreover, the first insulating ring 73 is sleeved in the second electrode 7. The first electrode 1 is able to pass through the first insulating ring 73.

Moreover, the second end of the first electrode 1 is through the second electrode 7 and held by a holding portion 21 of the pin holder 2, and the second end of the second electrode 7 is detachably mounted in the tip shell 6.

Figure 1:
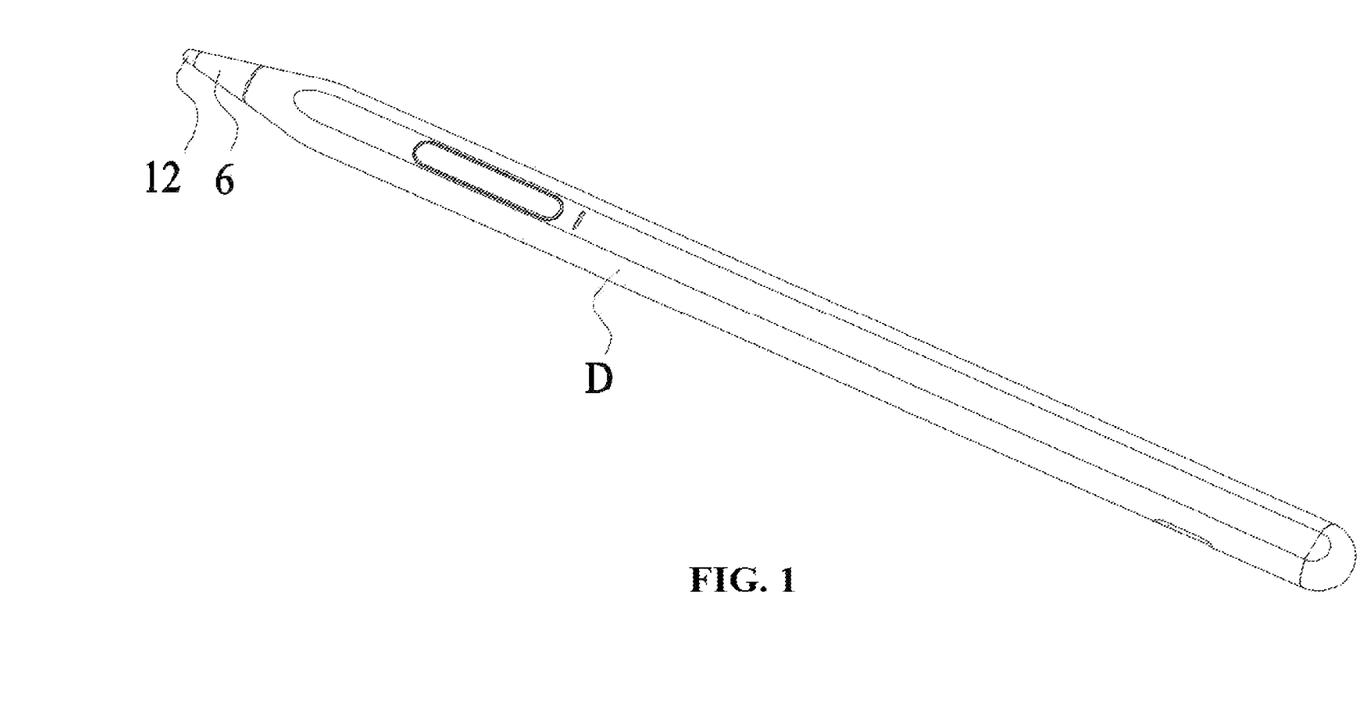
FIG. 1 is a schematic view of an active stylus of one embodiment the present disclosure.
Figure 2:
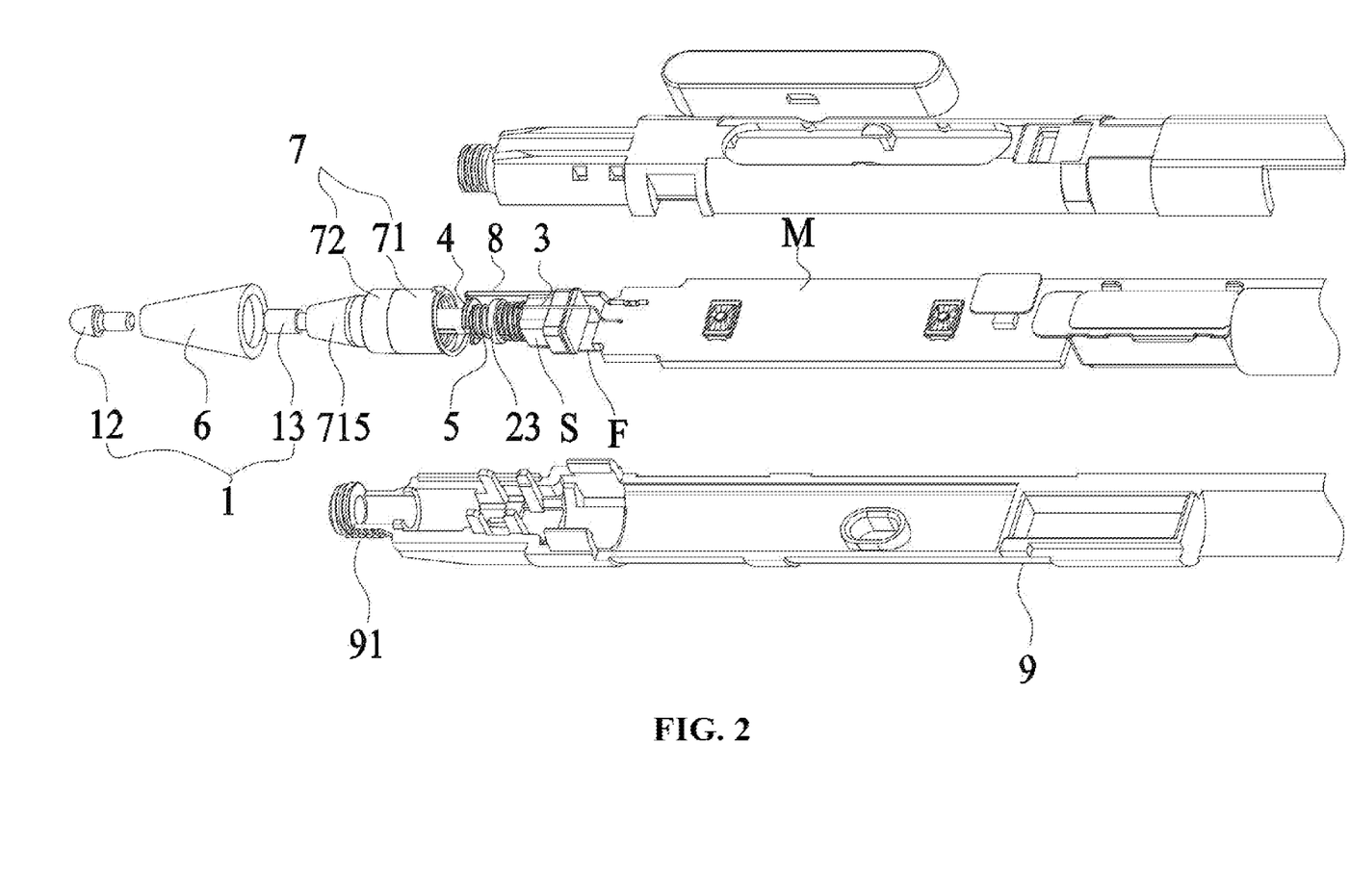
FIG. 2 is a schematic explosion view of a portion of an active stylus of one embodiment of the present disclosure.
Figure 3A:
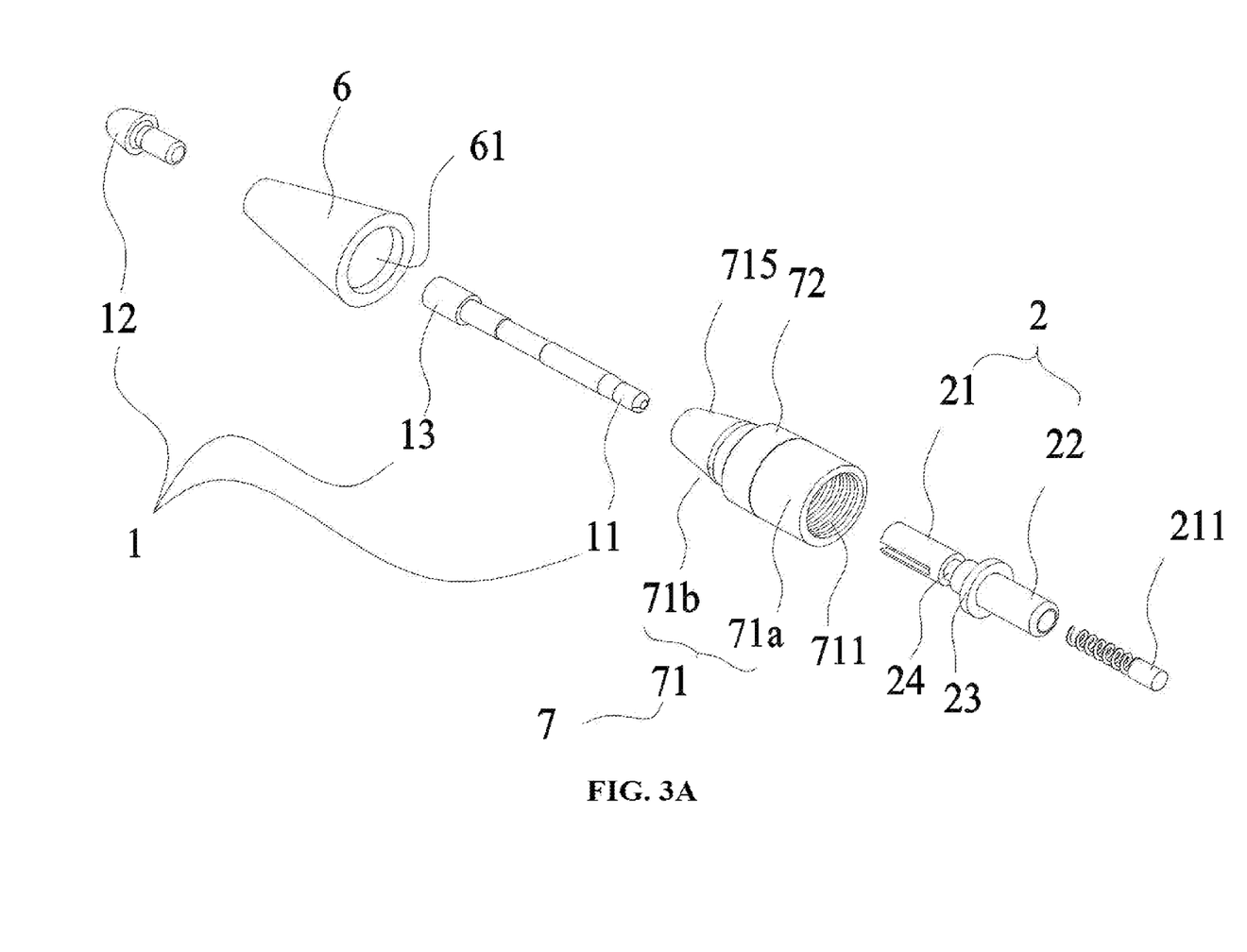
FIG. 3A to FIG. 3B are schematic explosion views of a portion of an active stylus of one embodiment of the present disclosure.
Figure 3B:
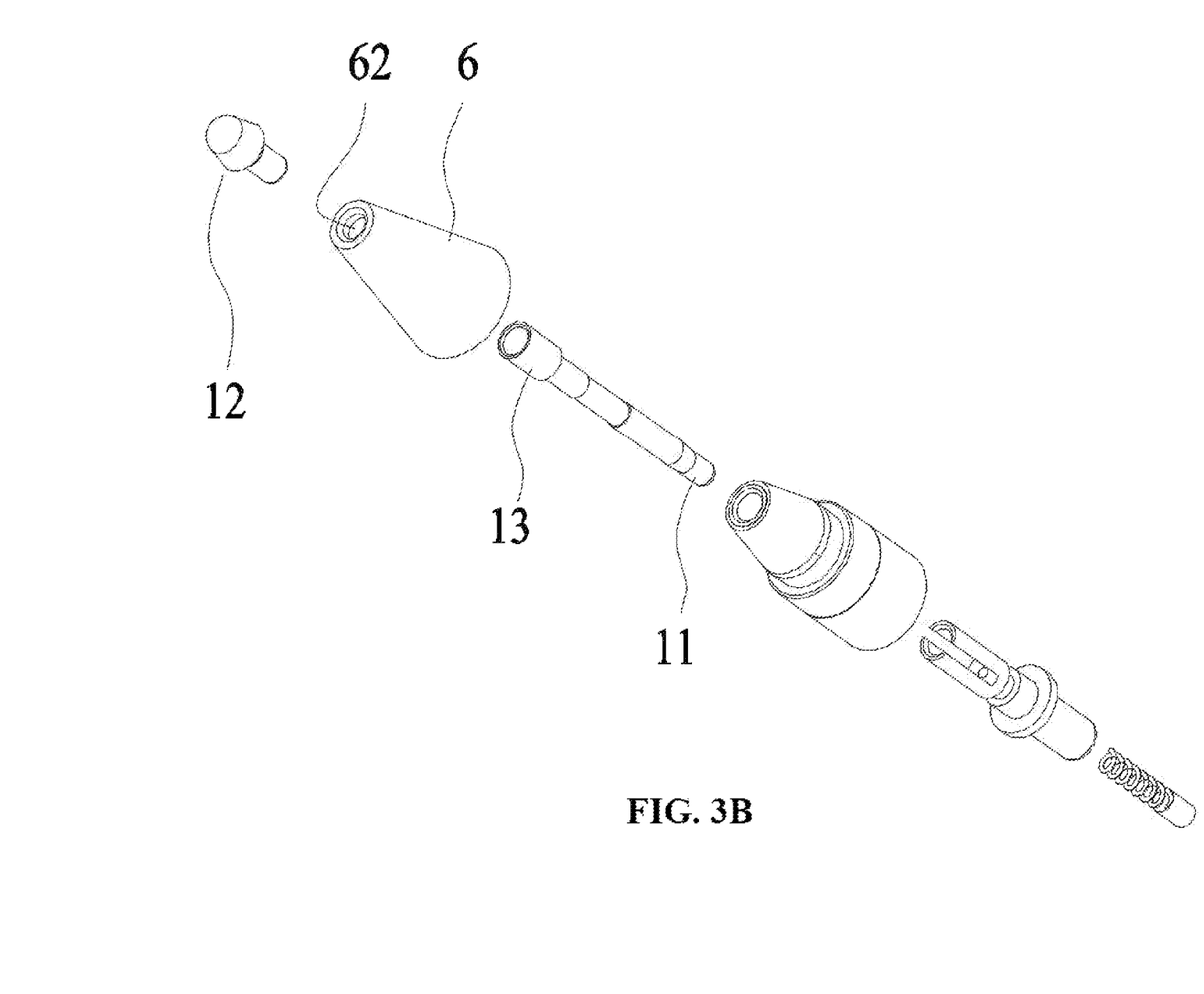

As shown in FIG. 1, the appearance of the active stylus then includes the tip shell 6 and the main body housing D. Therefore, the aesthetic appearance and simplicity of the active stylus is improved. Since the second electrode 7 is not exposed outside (exposed to the air), the service life of the second electrodes 7 is extended.

Moreover, in this embodiment, the second end of the first electrode 1 detachably held by the holding portion 21 of the pin holder 2. The second end of the second electrode 7 is detachably mounted in the tip shell 6. The second electrode 7 is detached from the holding portion 21 which means the second electrode 7 detached from the main body housing D. In this embodiment, the second electrode 7 is also detached from the tip shell 6. Therefore, the first electrode 1 and the tip shell 6 are replaceable.

As shown in FIG. 1, the main body housing D includes a hollow straight cylindrical portion and a hollow round table portion. The hollow round table portion shrinks toward the tip shell 6 and a third opening is formed at an end of the hollow straight cylindrical portion, away the hollow round table portion. The tip shell 6 includes a frustum-shaped housing and the second opening 61 formed at a bottom of the tip shell 6. The third opening is used to adapted with the second opening 61.

In some embodiments, the first electrode 1 is configured to transmit a first wireless signal and the second electrode 7 is configured to transmit a second wireless signal. In this embodiment, the frequency of the first wireless signal is different from the frequency of the second wireless signal. Therefore, the location, the tilt angle and other relevant information are determined in response to the first wireless signal and the second wireless signal received by an electronic apparatus, e. g. a tablet.

In some embodiments, the active stylus further includes a second insulating ring 72 and the second electrode 7 is sleeved in the second insulating ring 72. The outer peripheral surface of the second insulating ring 72 abuts against the third opening and the second electrode 7 does not contact the main body housing D. Therefore, the second electrode 7 is fixed without moving in the main body housing D.

In some embodiments, the main body housing D includes metal material. Since the second electrode 7 does not contact the main body housing D, in this embodiment, the electrical signal of the second electrode 7 will not flow to the ground via the main body housing D and human body.

In some embodiments, the second electrode 7 includes a first cylindrical portion 71a and a second cylindrical portion 71b. The first cylindrical portion 71a is used to fix the first end of the second electrode 7 in the main body housing D. The second cylindrical portion 71b is coaxial with the first cylindrical portion 71a. The outer radius of the second cylindrical portion 71b is shorter than the outer radius of the first cylindrical portion 71a. An annular step is formed at the junction between the first cylindrical portion 71a and the second cylindrical portion 71b. The second insulation ring 72 is sleeved on an outer peripheral surface 71b2 of the second cylindrical portion 71b. A first end of the second insulation ring 72 abuts against the annular step and a second end of the second insulation ring 72 abuts against the third opening. Therefore, the second insulation ring 72 is fixed at the third opening and the first cylindrical portion 71a has no contact with the main body housing D.

Figure 9:
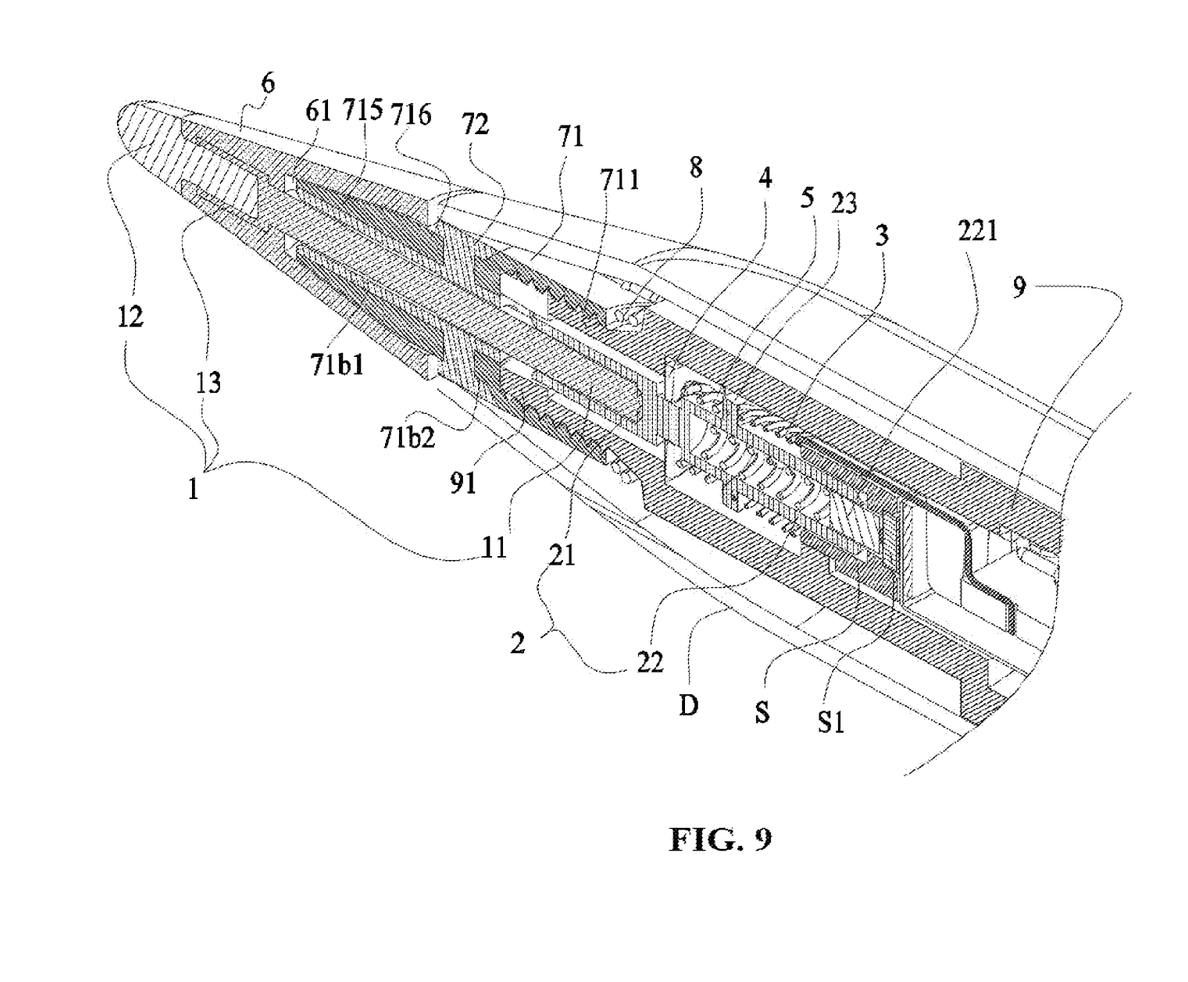
FIG. 9 is a schematic cross-sectional view of a portion of an active stylus of one embodiment of the present disclosure.

As shown in FIG. 9, an inner surface 71b1 of the second cylindrical portion 71b is sleeved on an outer peripheral surface of the first insulating ring 73. The inner radius of the second cylindrical portion 71b is shorter than the inner radius of the first cylindrical 71a.

Therefore, a portion of the second electrode 7 is in the main body housing D and the other portion of the second electrode 7 is in the tip shell 6. The second electrode 7 is also insulated from the main body housing D and the first electrode 1. Moreover, since the second insulating ring 72 is fixed at the third opening and abuts against the annular step, the second electrode 7 is prevented from loosening in the direction of the tip shell 6.

Furthermore, the second cylindrical portion 71b includes a cylindrical electrode tip 715 and a cylindrical conductive portion 716. The cylindrical conductive portion 716 includes a first end coupled to the first cylinder 71a and a second end coupled to a first end of the cylindrical electrode tip 715. The outer radius of the first end of the cylindrical electrode tip 715 is longer than the outer radius of the second end of the cylindrical electrode tip 715. A seamless transition from the outer peripheral surface of the first end of the cylindrical electrode tip 715 to the outer peripheral surface of the second end of the cylindrical electrode tip 715 is to form a slope-shaped outer peripheral surface.

The tip shell 6, in some embodiments, includes an inner frustum receiving portion. An apex of the inner frustum receiving portion is used to wrap the first end of the first electrode 1. The inner wall located at the middle portion of the inner frustum receiving portion is abutted with the slope-shaped outer peripheral surface of the cylindrical electrode tip 715. Moreover, in this embodiment, the cylindrical tip 715 is fixed in the tip shell 6 and the tip shell 6 is moved along the direction of the axis of the active stylus. Furthermore, the outer peripheral surface of the cylindrical electrode tip 715 is a slope-shaped outer peripheral surface, the wireless signal of the second electrode 7 is effectively transmitted.

As shown in FIG. 4A, an end of the first electrode 1 includes the frustum 121 and the arc surface 122. Moreover, since the seamless transition is formed from the arc surface 122 to the frustum 121, the wireless signal transmitted by the first electrode 1 is effectively transmitted and the first electrode 1 is fixed in the tip shell 6.

In some embodiments, a first gap is located between the tip head of the cylindrical electrode tip 715 and the frustum receiving portion. Moreover, a second gap is located between the second opening and the third opening. Therefore, with the buffer space provided by the first gap and the second gap, the damage probability of a force sensor of the active stylus will be greatly decreased.

In some embodiments, the active stylus further includes an inner case 9 which is made of non-metal material. The inner case 9 is fixed in the main body housing D. A first end of the inner case 9 is coupled to the first cylindrical portion 71a to fixed the second electrode 7. The printed circuit board (M, F), a fixer S for holding the pin holder 2, the pin holder 2 are located in the inner case 9. The printed circuit board M is electrically coupled to the first electrode 1 and the second electrode 7. The printed circuit board M provides a first signal to the first electrode 1 and a second signal to the second electrode 7. An end of the fixer S, toward the tip shell 6, includes an accommodation portion. A first end of the pin holder 2 is accommodated in the accommodation portion and a second end of the pin holder 2 is used for holding the first electrode 1.

In some embodiments, the main body housing D is made of metal material. Since the inner case 9 is made of non-metal material, the conductive components in the inner case 9 are insulated from the main body housing D. In this embodiment, the metal material includes copper, aluminum, stainless steel, aluminum alloy and titanium alloy.

The fixer S includes a main body portion and an extension portion. A end of the main body of the fixer S includes the accommodation portion and an opening of the accommodation portion is toward the tip shell 6. The extension portion of the fixer S are respectively located on both sides of the main body portion of the fixer S. The extension portion is used to work with the buckle structure in the inner case 9. The fixer S is then arranged at a predetermined location in the inner case 9. Therefore, with the main body portion and the extension portion of the fixer S, the fixer S is then fixed in the inner case 9. Since the accommodation portion holds the pin holder 2, the pin holder 2 only slightly moves along the direction of the active stylus.

Furthermore, a force sensor Si is located at the bottom of the accommodation portion. When the tip shell 6 is pressed, the first electrode 1 moves relatively along the axial direction of the active stylus, the pin holder 2 is then driven to move relatively along the axial direction of the active stylus. Therefore, the force sensor Si is then pressed and a stress is then generated. The stress is then sensed by the force sensor Si and a sensing signal is generated in response to the sensed stress. The sensing signal is then transformed to a wireless signal transmitted to an external electronic apparatus with a touch screen. The information will be displayed on the touch screen in response to the received wireless signal.

In some embodiments, the pin holder 2 includes a stress transferring portion 22, a holding portion 21, a first spring (not shown), a second spring 3 and a third spring 5. The stress transferring portion 22, in this embodiment, includes a accommodation cavity having an opening toward the fixer S and a ring block 23. A concave ring 24 is formed between the peripheral surface of the stress transferring portion 22 and the peripheral surface of the holding portion 21. A snap ring 4 is mounted on the concave ring 24. An end of a first spring abuts against the bottom on the accommodation cavity. The other end of the first spring abuts a slider 221 and the slider 221 abuts against the force sensor Si. A second spring 3 is sleeved on the peripheral surface of the stress transferring portion 22 and respectively abuts against the ring block 23 and the fixer S. Moreover, the second spring 3 includes an extension portion coupled to the printed circuit board M. A third spring 5 is sleeved on the peripheral surface of the stress transferring portion 22 and respectively abuts against the ring block 23 and the snap ring 4. A side of the snap ring 4 abuts against the third spring 5, and the other side of the snap ring 4 abuts against a step 92 at the inner wall of the inner case 9.

When the active stylus is in service, the first electrode 1 is pressed, a stress is generated and is transferred, via the first electrode 1, the holding portion 21 and the stress transferring portion 22 and along the axis of the active stylus, to compress the first spring. Therefore, the stress is then transferred to the force sensor via the slider 221. The second spring 3 is always in a pre-compression state to ensure the second spring 3 is physically contact with the ring block 23. Moreover, since the second spring 3 is always in the pre-compression state, the slider 221 is then always contact with the force sensor Si. In some embodiments, the slider is always close to the force sensor Si. Furthermore, with the pin holder 2 of the present disclosure, the stress caused by the user's writing press is effectively sensed and the electronic signal transmitted from the printed circuit board M is then surely transmitted.

In some embodiments, the active stylus of the present disclosure further includes a fourth spring 8 physically contact with the first cylindrical portion 71a. The fourth spring 8 includes an extension portion coupled to the printed circuit board M.

In some embodiments, a second end of the inner case 9 includes an external thread 91. A step is formed between the external thread 91 and area adjacent the external thread 91 on the external surface of the inner case 9. Moreover, the first cylindrical portion 71a includes an internal thread 711. Therefore, the second end of the inner case 9 is screwed in the first cylindrical portion 71a with the external thread 91 and the internal thread 711. The fourth spring 8 is sleeved on the external surface of the inner case 9 and respectively abuts against the first cylindrical portion 71a and the step formed between the external thread 91 and the area adjacent the external thread 91 on the external surface of the inner case 9. The fourth spring 4 is always in a compression state to ensure the fourth spring 4 is physically contact with the second cylindrical portion 71b and the electronic signal transmitted from the printed circuit board M is then surely transmitted. Moreover, with the inner case 9 and the thread structure, the second electrode 7 is then fixed.

In some embodiments, the main body housing D is made od metal material which provides functions of signal shielding.

In some embodiments, the main body housing D is electrically connected to the ground terminal of the internal circuit board to form a loop.

In some embodiments, the active stylus further includes a vibrator which can improve the user experience and increase the fun of use.

In some embodiments, the active stylus further includes other components such as batteries, magnets, buttons, lights, etc.

The following is a signal transmission method of the active stylus of one embodiment of the present disclosure. A first signal is transmitted from the printed circuit board M to the first electrode 1 via the second spring 3 and the pin holder 2. The first signal is transformed to a first wireless signal and the first wireless signal is then emitted by the first end 12 of the first electrode 1. A second signal is transmitted from the print circuit board M to the second electrode 7 via the fourth spring 8. The second signal is transformed to a second wireless signal and the second wireless signal is then emitted by the second end, the cylindrical electrode tip 715, of the second electrode 7.

In some embodiments, the tip shell 6 is made of non-conductive material. In some embodiments, the main body housing D is made of metal material and the inner shell 9 is made of non-metal material. In some embodiments, the fixer S is made of non-metal material and the ground terminal of the printed circuit board (M and F) is connected to the main body housing D.

The embodiments shown and described above are only examples and do not limit the patent scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An active stylus having physical writing function, comprising:
 a tip shell including a first opening formed at a cross section of the tip shell and a second opening formed at a bottom of the tip shell, wherein the tip shell includes non-conductive material and wherein a first limit ring is formed on an inner side of the tip shell and close to the first opening and a second limit ring is formed on the inner side of the tip shell and located between the first opening and the second opening; and
 a first electrode including a writing electrode and a non-writing electrode, wherein a first end of the writing electrode protrudes through the first opening of the tip shell and a second end of the writing electrode is received by a receiving cavity of the non-writing electrode and wherein an end of the non-writing electrode which is away from the writing electrode protrudes through the second opening of the tip shell and entered a main body housing of the active stylus, wherein the first electrode includes conductive material;

wherein the writing electrode is configured to leave colored traces on an object by physical friction caused between the writing electrode and the object; and wherein the first limit ring is configured to prevent the writing electrode from detaching.

2. The active stylus of claim 1, wherein the first end of the first electrode includes a writable conductive material.

3. The active stylus of claim 2, wherein the writable conductive material includes Graphite alloy.

4. The active stylus of claim 2, wherein the writable conductive material includes Zinc alloy.

5. The active stylus of claim 2, wherein the writable conductive material includes Lead alloy.

6. The active stylus of claim 2, wherein the writable conductive material is left on an object to form colored traces on the object by physical friction caused between the first electrode and the object.

7. The active stylus of claim 1, wherein the writing electrode includes a writable conductive material and the non-writing electrode includes a conductive material.

8. The active stylus of claim 1, wherein the writing electrode includes a writable conductive material and the non-writing electrode includes a writable conductive material.

9. The active stylus of claim 1, wherein the first end of the writing electrode includes: a frustum, wherein a first end surface of the frustum includes an arc surface and a seamless transition from the arc surface to the frustum; and a second end surface of the frustum including a cylinder, wherein an end of the cylinder away from the frustum is the second end of the writing electrode.

10. The active stylus of claim 1, wherein the tip shell includes a hollow frustum-shaped housing and a smooth transition is from an outer peripheral surface of a frustum to an outer peripheral surface of the hollow frustum-shaped housing.

11. The active stylus of claim 1, wherein the first electrode is configured to transmit a wireless signal.

12. The active stylus of claim 1, wherein the main body housing includes: a pin holder; and a second electrode including a first insulating ring configured to insulate the first electrode, and a first end of the second electrode is located in the main body housing and a second end of the second electrode is protruded through the main body housing; wherein the second end of the first electrode is through the second electrode and held by a holding portion of the pin holder, and the second end of the second electrode is detachably mounted in the tip shell.

13. The active stylus of claim 12, wherein the second electrode includes a cylindrical electrode.

14. The active stylus of claim 1, wherein the object includes a piece of paper.

* * * * *